United States Patent [19]

Anno et al.

[11] Patent Number: 5,029,247
[45] Date of Patent: Jul. 2, 1991

[54] X-RAY IMAGE INTENSIFIER AND METHOD OF MANUFACTURING INPUT SCREEN

[75] Inventors: Hidero Anno, Ootawara; Katsuhiro Ono, Kawasaki, both of Japan

[73] Assignee: Kabushiki Kaisha Toshiba, Kawasaki, Japan

[21] Appl. No.: 524,488

[22] Filed: May 17, 1990

[30] Foreign Application Priority Data

Jun. 20, 1989 [JP] Japan ................................ 1-156965
Jul. 28, 1989 [JP] Japan ................................ 1-195617

[51] Int. Cl.$^5$ ............................................. H01J 31/50
[52] U.S. Cl. .............................. 250/213 VT; 313/527
[58] Field of Search .......... 250/213 VT, 486.1, 483.1; 313/525, 527, 530, 541–543

[56] References Cited

U.S. PATENT DOCUMENTS

| | | | |
|---|---|---|---|
| 4,752,681 | 6/1988 | Anno et al. | 250/486.1 |
| 4,847,482 | 7/1989 | Kubo | 250/213 VT |
| 4,935,617 | 6/1990 | Anno et al. | 250/213 VT |

*Primary Examiner*—Davis L. Willis
*Assistant Examiner*—K. Shami
*Attorney, Agent, or Firm*—Cushman, Darby & Cushman

[57] ABSTRACT

An X-ray image intensifier includes an input screen for converting incident X-rays into photoelectrons, and an output screen for converting the photoelectrons into visible light. The input screen includes a phosphor layer. The phosphor layer has a large number of columnar crystals of a phosphor which have end faces constituting a smooth surface facing the output screen. A low-refractive-index layer is formed on the phosphor layer and made of a material having a refractive index smaller than a refractive index of the phosphor, with respect to the light having a specified wavelength, at which the fluorescence of the phosphor is the most intensive. A photoemissive layer is formed directly or indirectly on the low-refractive-index layer.

21 Claims, 6 Drawing Sheets

X-RAY IMAGE INTENSIFIER AND METHOD OF MANUFACTURING INPUT SCREEN

Background of the Invention

1. Field of the Invention

The present invention relates to an X-ray image intensifier and, more particularly, to an X-ray image intensifier having an improved input screen and a method of manufacturing the input screen.

2. Description of the Related Art

An observation system generally includes an X-ray tube and an X-ray image intensifier arranged in front of the X-ray tube. An object to be imaged is placed between them. When X-rays emitted from the X-ray tube are transmitted through the object, a modulated X-ray image is formed. The X-ray image is incident on the X-ray image intensifier. A visible output image obtained by the X-ray image intensifier is then imaged by, e.g., an imaging camera and is reproduced by a monitor TV.

The X-ray image intensifier has an input screen and an output screen located to oppose the input screen. In an operation, a modulated X-ray image incident on the image intensifier is converted into a photoelectron image by the input screen. This photoelectron image is accelerated and focused toward the output screen. As a result, a visible output image with an enhanced brightness is obtained. The output image is observed through an imaging camera or the like.

The input screen of a conventional X-ray image intensifier comprises: a spherical aluminum substrate having a smooth surface; a first phosphor layer formed on the concave surface of the substrate by vapor deposition at a low vacuum and having sodium-activated cesium iodide (CsI) as a major element; a second phosphor layer formed on the first phosphor layer by vapor deposition at a high vacuum; and an intermediate layer and a photoemissive layer sequentially formed on the second phos-phor layer. The first phosphor layer as the major component of a phosphor layer is constituted by an aggregate of columnar crystals each of which is grown perpendicular to the substrate and has an average diameter of about 5 $\mu$m and a length of about 400 $\mu$m. The respective adjacent crystals are separated from each other with small gaps.

Since the distal ends of these columnar crystals are tapered to have a conical shape, the first phosphor layer has a rough surface. In contrast to this, the second phosphor layer, which is formed on the surface of the first phosphor layer so as to have a thickness of 10 to 30 $\mu$m and constitutes an outer layer of the phosphor layer, has a relatively continuous surface. For this reason, the intermediate layer and the photoemissive layer formed on the second phosphor layer can ensure electrical conduction in a direction parallel to their surfaces.

In the observation system using the X-ray image intensifier having the above-described arrangement, in order to minimize exposure of the object to X-rays the X-rays transmitted through the object must be applied to the phosphor layer without a loss so that the absorption amount of x-rays in the phosphor layer is increased. In order to increase the absorption amount of X-rays in the phosphor layer, each columnar crystal of the phosphor should preferably be lengthened. However, if the length of each columnar crystal is increased, so that the amount of fluorescence propagating from the side surface of one crystal to another increases. As a result, the resolution of the image intensifier lowers. Therefore, the columnar crystals cannot be made very long, and are limited to a length of 400 $\mu$m or thereabout.

More specifically, assume that an X-ray image is incident on the input screen, and X-rays are absorbed at a point A in on of the columnar crystals of the phosphor layer so that fluorescence is emitted from the point A. Of the rays radiating from the point A in various directions, a ray R1 which is incident on the interface between the columnar crystal and an adjacent gap at an angle $\theta$ larger than a critical angle $\theta c$ (=33° when the refractive index of the CsI phosphor is set to be 1.84) which is defined as $$\theta c = sin^{-1} (1/\text{refractive index})$$

propagates in the crystal to the photoemissive layer while repeating totally reflection at the interface.

Rays which are incident on the interface at an angle $\theta$ smaller than the critical angle $\theta c$ are successively diffused and propagate in the adjacent columnar crystals. Of these rays, a ray R2 which propagates to the photoemissive layer side is incident on the photoemissive layer at an angle $\alpha$ and at position located far away from the emission point A in the lateral direction of the phosphor layer. In contrast to this, a ray R3 which propagates from the emission point A to the substrate side is reflected by the interface between the substrate and the phosphor layer and is subsequently incident on the photoemissive layer at a position located farther away from the point A than the point on which the ray R2 is incident.

The surface of the phosphor layer is rough in accordance with the sharp distal ends of the columnar crystals. For this reason, the incident angle $\alpha$ of the rays R2 and R3 with respect to the photoemissive layer are substantially 0°, so that these rays are almost vertically incident on the interface between the phosphor layer and the photoemissive layer. Thus, these rays are incident on the photoemissive layer without being reflected by the interface.

Fluorescent components represented by the ray R1 propagate in the columnar crystals in which they are produced and reach the photoemissive layer without diffusing into other adjacent columnar crystals. Therefore, these fluorescent components hold incidence position data of X-rays with high precision. However, fluorescent components represented by the rays R2 and R3 successively propagate in the adjacent columnar crystals. This lowers the precision of incident position data of X-rays on the input screen and the resolution thereof.

The fluorescent components represented by the rays R2 and R3, as factors that lower the resolution, are increased with an increase in length of each columnar crystal. For this reason, as described above, the length of each crystal cannot be satisfactorily increased and is limited to about 400 $\mu$m.

The fluorescent components represented by the rays R2 and R3 are partially reflected in the opposite direction when they transmit through the interfaces between the crystals and the gaps, thus being gradually attenuated. Therefore, the attenuation amount of these components may be increased by decreasing the diameter of each columnar crystal to increase the frequency of reflection of the components. In this case, the diffusion distance of the fluorescent components are decreased, and a decease in resolution of the input screen may be suppressed. However, it is confirmed that even if the diameter of each columnar crystal is reduced to about 5 μm or less, an effect of improvement exhibits saturation at a certain point.

In addition, it is known that a light-absorbing layer is formed between a phosphor layer and a substrate in order to improve the resolution of the input screen. However, in a phosphor layer constituted by columnar crystals each having a small diameter of about 5 μm, the MTF characteristics of the input screen with a light-absorbing layer exhibit only a slight improvement as compared with that of an input screen without a light-absorbing layer, and any satisfactory effect cannot be obtained.

SUMMARY OF THE INVENTION

The present invention has been made in consideration of the above situation, and its object is to provide an X-ray image intensifier which includes an input screen having a phosphor layer constituted by an aggregate of phosphor columnar crystals and which has greatly improved resolution characteristics, and a method of manufacturing the input screen of the X-ray image intensifier.

In order to achieve the above object, according to an X-ray image intensifier of the present invention, a large number of columnar crystals of a phosphor constituting an input screen have flat distal end portions which constitute the upper surface of a phosphor layer. A low-refractive-index layer is formed on the upper surface of the phosphor layer. The low-refractive index layer formed of a material having a refractive index smaller than that of the phosphor, with respect to the light having a specified wavelength, at which the fluorescence of the phosphor is the most intensive.

According to the X-ray image intensifier having the above-described arrangement, fluorescent components, which are emitted from an emission point in one columnar crystal of the phosphor layer and successively propagate in the adjacent columnar crystals, are reflected by the interface between the phosphor layer and the low-refractive-index layer. Therefore, incidence of these fluorescent components on a photoelectric layer can be prevented, thereby suppressing degradation in the resolution of the X-ray image intensifier.

Further, according to the present invention, a light-absorbing layer for absorbing at least some of fluorescent components may be formed on the incidence surface side of the phosphor layer, i.e., the surface opposite to the surface on which the low-refractive-index layer is formed.

In this case, fluorescent components, which are reflected by the interface between the phosphor layer and the low-refractive-index layer and reach the light-absorbing layer, and fluorescent components propagating from the emission point to the light-absorbing layer can be efficiently absorbed and eliminated by the light-absorbing layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 and 2 show an X-ray image intensifier according to a first embodiment of the present invention, in which FIG. 1 is a partially cutaway side view showing a schematic arrangement of an object observation system including the X-ray image intensifier, and FIG. 2 is an enlarged sectional view of an input screen of the X-ray image intensifier;

FIGS. 6 to 8 show an X-ray image intensifier according to a third embodiment of the present invention, in which FIG. 6 is a sectional view of a mold for manufacturing a phosphor layer of the X-ray image intensifier, FIG. 7 is an enlarged sectional view of an input screen of the X-ray image intensifier, and FIG. 8 is an enlarged plan view of a surface of the input screen.

DETAILED DESCRIPTION OF THE PREFERRED EMBODIMENTS

Embodiments of the present invention will be described in detail with reference to the accompanying drawings.

Figure 1:
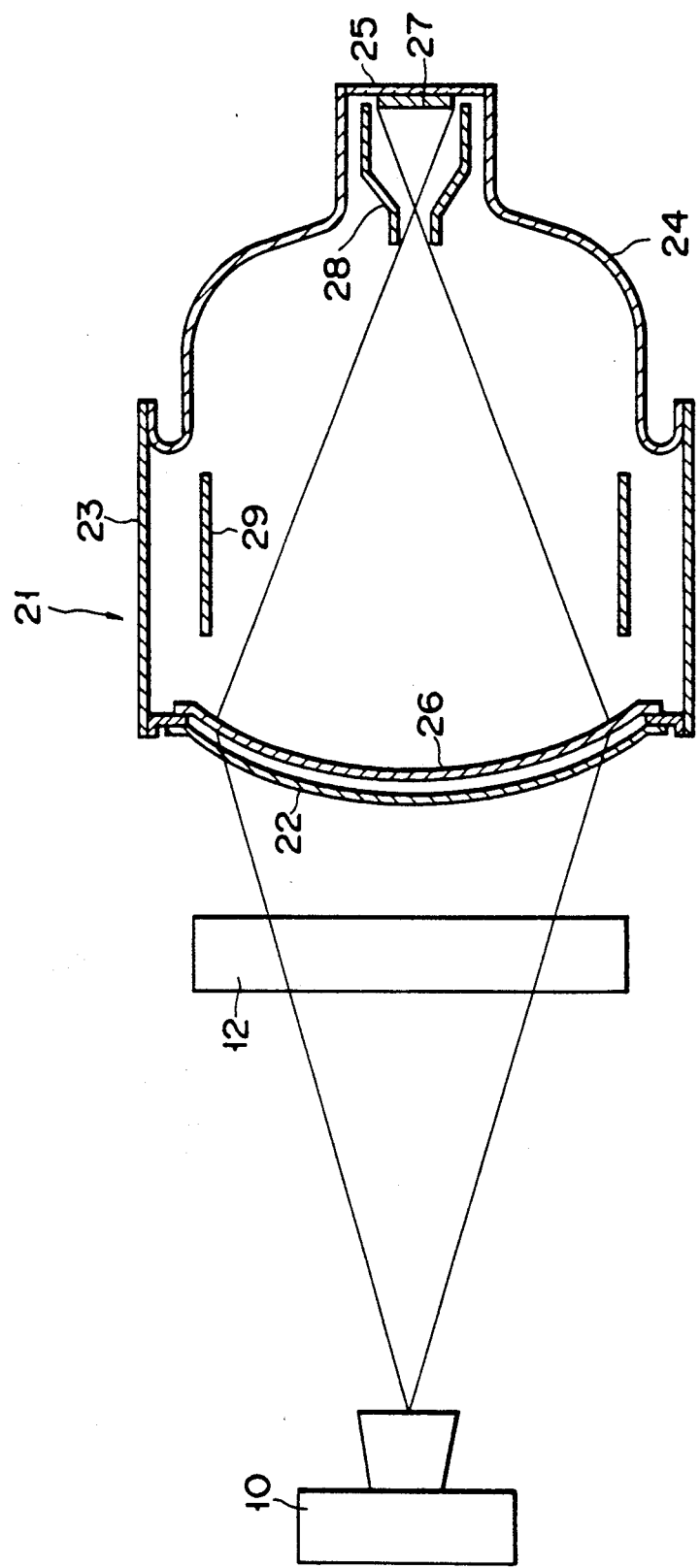

FIG. 1 shows an object observation system including an X-ray image intensifier according to a first embodiment of the present invention.

The X-ray image intensifier includes a vacuum envelope 21. The envelope 21 comprises: a substantially cylindrical metallic barrel portion 23; a spherical input window 22 airtightly sealed on one end of the barrel portion and consisting of a metal permeable to X-rays; a funnel-shaped seal member 24 of Kovar one end of which is airtightly sealed o the other end of the barrel portion; and a glass output window 25 sealed on the other end of the seal member.

An input screen 26 having a phosphor layer and a photoemissive layer (to be described later) is arranged on the inner side, i.e., the concave surface side of the input window 22. In addition, an output screen 27 having a phosphor layer is formed on the inner surface of the output window 25 so as to oppose the input screen 26. A focusing electrode 29 is arranged inside the barrel portion 23, whereas an anode 28 is arranged inside the seal member 24 so as to oppose the output screen 27.

The observation system includes a X-ray tube 10 arranged in front of the X-ray image intensifier. An object 12 to be imaged is placed between the X-ray tube 10 and the X-ray image intensifier. X-ray radiated from the X-ray tube 10 are transmitted through the object 12 to form a modulated X-ray image. This X-ray image is transmitted through the input window 22 of the X-ray image intensifier and is incident on the input screen 26. The incident X-ray image causes the phosphor layer of the input screen 26 to produce fluorescence. The fluorescence then causes the photoemissive layer to generate photoelectrons. Thus, the X-ray image is converted into a photoelectron image. The photoelectron image is accelerated and focused by the anode 2 and the focusing electrode 29, and subsequently reaches the output screen 27, whereupon it is converted into a high-luminance visible light image by the phosphor layer.

The input screen 26 of the X-ray image intensifier will be described in detail.

Figure 2:
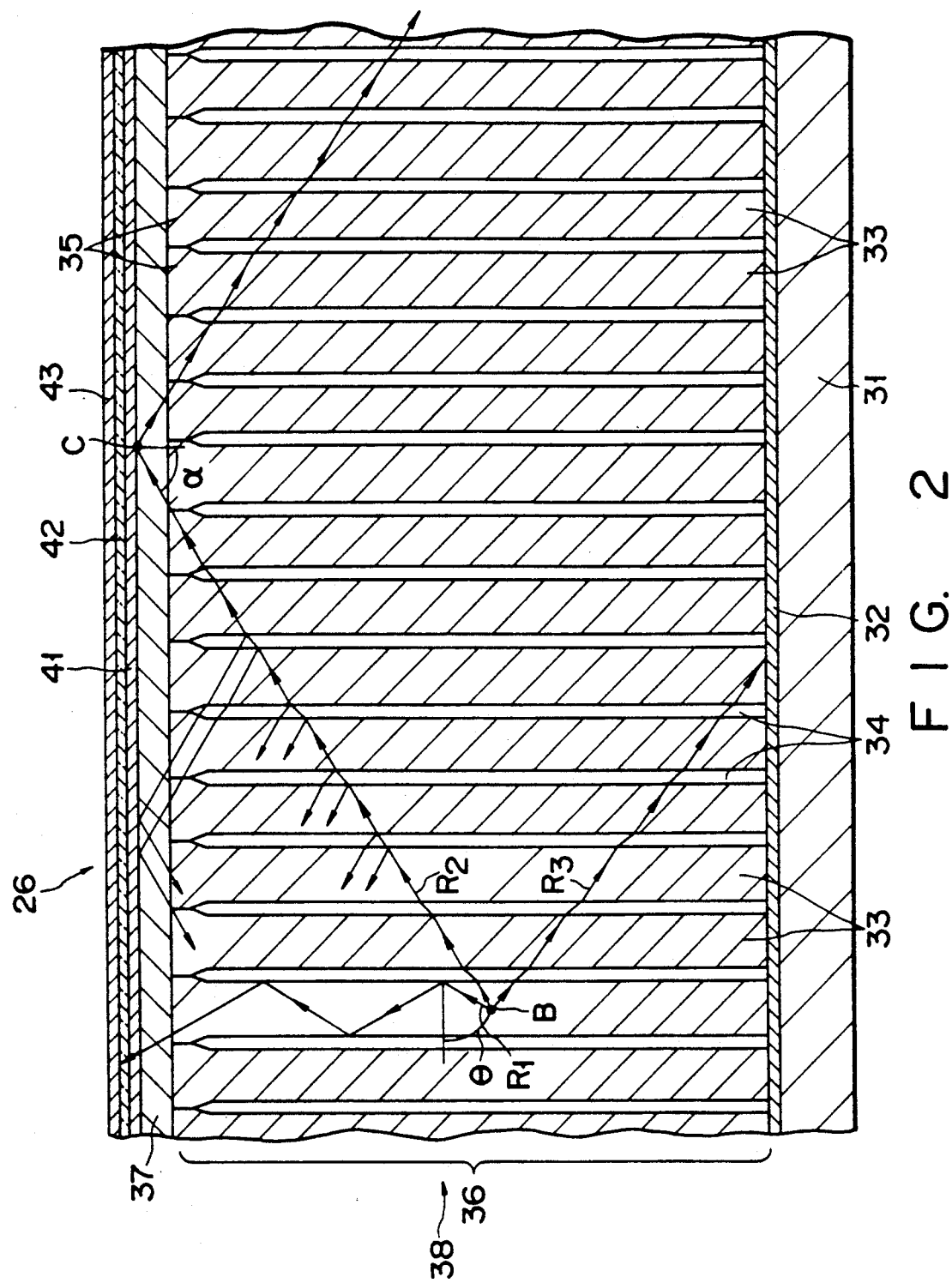

As shown in FIG. 2, the input screen 26 includes a substrate 31 having a concave inner surface and formed of, e.g., a thin aluminum plate, and a light-absorbing layer 32 formed on the inner surface of the substrate 31. In this embodiment, as the light-absorbing layer 32, an Ni-Cr alloy deposition film having a thickness of 200 Å is used. This light-absorbing film has an absorptance of about 90 to 95% for the fluorescence.

A large number of columnar crystals 33 constituted by cesium iodide (CsI) activated by sodium (Na) are formed on the light-absorbing layer 32. An aggregate of the crystals 33 constitutes a first phosphor layer 36. The columnar crystals 33 extend from a surface of the light-absorbing layer 32 toward the center of curvature of the substrate 31. Gaps 34 of a width required for optically separation between the crystals are defined between the respective adjacent crystals 33. The distal end portion of each crystal 33, i.e., each top portion 35, located on the opposite side to the substrate 31, is flattened to have a larger diameter than other portion of the crystal. For this reason, the top portions 35 of the adjacent columnar crystals 33 ar in tight contact with each other so as to constitute a continuous surface. Therefore, the upper surface of the first phosphor layer 36, which is constituted by the upper surfaces of the top portions 35, has a substantially mirror-like state.

The following method is used to flatten the top portions 35 of a large number of columnar crystals 33, thereby forming a continuous surface. One method is a tumbling method, for example, wherein a large number of small metal balls of stainless steel or the like are placed on a large number of columnar crystals formed by vapor deposition, and these small balls are then horizontally oscillated to depress the top portions of the crystals, thereby flattening and transforming them into large-diameter portions. In this case, in order to prevent degradation in optical characteristics of the phosphor layer 33, the force acting on the crystals 33 in the longitudinal direction thereof during machining is preferably limited to a small value so as to prevent adverse influences on portions located 10 μm or more deep from the surface of the first phosphor layer 36.

As described above, the top portions 35 of the columnar crystals 33 ar horizontally extended to be increased in diameter and flattened upon reception of an external force in the horizontal direction. As a result, the gaps like pinholes between the adjacent top portions 35 are extremely reduced, substantially to zero.

A second phosphor layer 37 formed of a sodium-activated cesium iodide phosphor and having a continuous surface is formed on the surface of the first phosphor layer 36 by high-vacuum deposition so as to have a thickness of 5 μm. A phosphor layer 38 is constituted by the first phosphor layer 36 as the major element and the second phosphor layer 37 as an outer layer of the phosphor layer 36. As described above, the surface of the second phosphor layer 37 is superior in flatness to that of the first phosphor layer 36 which is flattened by tumbling, and is a substantially mirror surface.

A low-refractive-index layer 41 formed of, e.g., $SiO_2$ is deposited on the surface of the second phosphor layer 37 to a thickness of about 2 μm. The layer 41 is made of a material having a smaller refractive index than that of the phosphor constituting the phosphor layer 38, with respect to the light having a specified wavelength, at which the fluorescence of the phosphor is the most intensive. A transparent conductive film 42 and a photoemissive layer 43 formed of, e.g., $K_2CsSb$ are sequentially formed on the upper surface of the low-refractive-index layer 41.

The operation of the X-ray image intensifier 26 having the above-described arrangement will be described.

Assume, as shown in FIG. 2, that X-rays are incident on the input screen 26 and absorbed at a point B in one of the columnar crystals 33 of the phosphor layer 38, and fluorescence is emitted from the point B. Of the rays emitted from the point B in various directions, a ray R1 which is incident on the interface between the columnar crystal 33 and an adjacent gap 34 at an angle $\theta$ larger than a critical angle $\theta c$ defined as $$\theta c = sin^{-1}(1/\text{refractive index})$$

propagates in the crystal while being totally reflected by the interface a plurality of times and reaches to the photoemissive layer 4 through the low-refractive-index layer 41 and the conductive film 42.

Of the rays which are incident on the interface at angles $\theta$ smaller than the critical angle $\theta c$, a ray R2 propagating toward the photoemissive layer 43 successively diffuses into the adjacent columnar crystals 33, and is incident on a point C on the interface between the phosphor layer 38 and the low-refractive-index layer 41, which is located far away from the emission point B in the lateral direction of the phosphor layer 38, at an angle $\alpha$.

In this case, since the surface of the phosphor layer 38 is formed in&.o a substantially mirror surface, if a relative refractive index Nr of the low-refractive-index layer 41 with respect to the phosphor satisfies the following equation:

$$Nr \leq sin(90° - \theta c) = 0.839 \qquad (a),$$

all the rays R2, which are incident on the interface between the columnar crystal 33 and the gap 34 at the angel $\theta < \theta c$, are totally reflected at the point C and hence are not incident on the photoemissive layer 43. Each ray R2 totally reflected at the point C successively diffuses into the adjacent columnar crystals 33 and is incident on the surface of the substrate 31 at the angle $\alpha$. However, since the light-absorbing film 32 having a high absorptance of 90 to 95% for fluorescence is arranged between the substrate 31 and the phosphor layer 38, the ray R2 is effectively absorbed by the film 32 and disappears.

Note that a condition satisfying a refractive index N of the low-refractive-index layer 41 is represented by the following inequality according to equation (a):

$$N \leq 1.54 \qquad (b)$$

The refractive index N of $SiO_2$ constituting the low-refractive-index layer 41 is about 1.49 and hence satisfies inequality (b). Therefore, the ray R2 is not incident on the photoemissive layer 43 and disappears.

In contrast to this, a ray R3, which is emitted from the emission point B and diffuses toward the substrate 31, is absorbed by the light-absorbing layer 32 and disappears.

Figure 4:
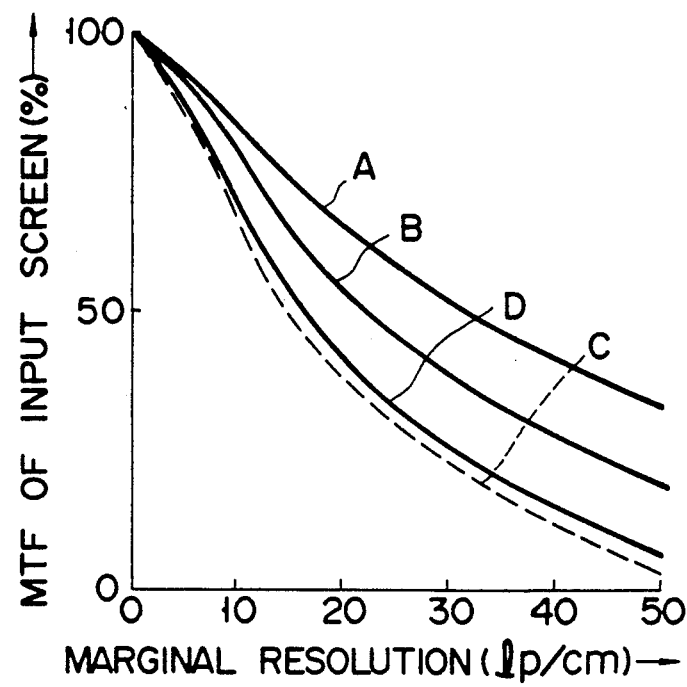
FIG. 4 is a graph for comparing the MTF characteristics of the input screens of the X-ray image intensifiers according to the first and second embodiments with those of an input screen of a conventional X-ray image intensifier.
Figure 5:
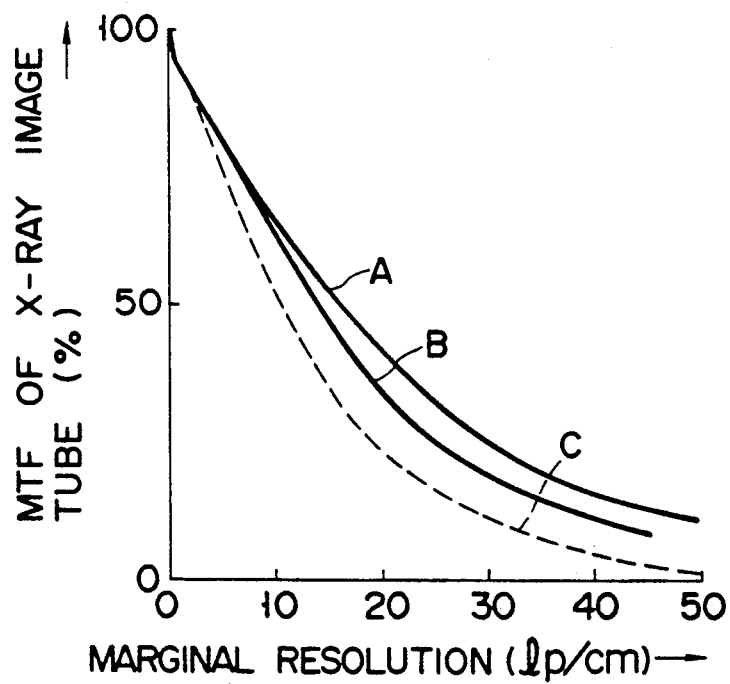
FIG. 5 is a graph for comparing the MTF characteristics of the X-ray image intensifiers according to the first and second embodiments with those of the conventional X-ray image intensifier.

As described above, fluorescent components represented by the rays R2 and R3, as factors causing degradation in resolution characteristics of the input screen 26, are eliminated without being incident on the photoemissive layer 43. As shown in FIG. 4, therefore, the MTF (Modulation Transfer Function) characteristics of the input screen 26 are greatly improved as compared with a conventional input screen. As shown in FIG. 5, thus, the MTF characteristics of the X-ray image intensifier having the input screen 26 are greatly improved as compared with the MTF characteristics of an X-ray image intensifier using a conventional input screen having a phosphor layer whose thickness is the same as that of the phosphor layer of the input screen 26. Referring to FIGS. 4 and 5, curves A respectively represent the MTF characteristics of the input screen and of the X-ray image intensifier of the present embodiment; curves C, the MTF char-acteristics of a conventional input screen having no light-absorbing layer and of a conventional X-ray image intensifier; and a curve D, the MTF characteristics of a conventional input screen having a light-absorbing layer.

In this embodiment, even when the thickness of the phosphor layer 38 was set to be 900 μm which is about 2.2 times that of a conventional phosphor layer in order to improve the absorption efficiency of X-rays, the MTF characteristics underwent n degradation.

Figure 3:
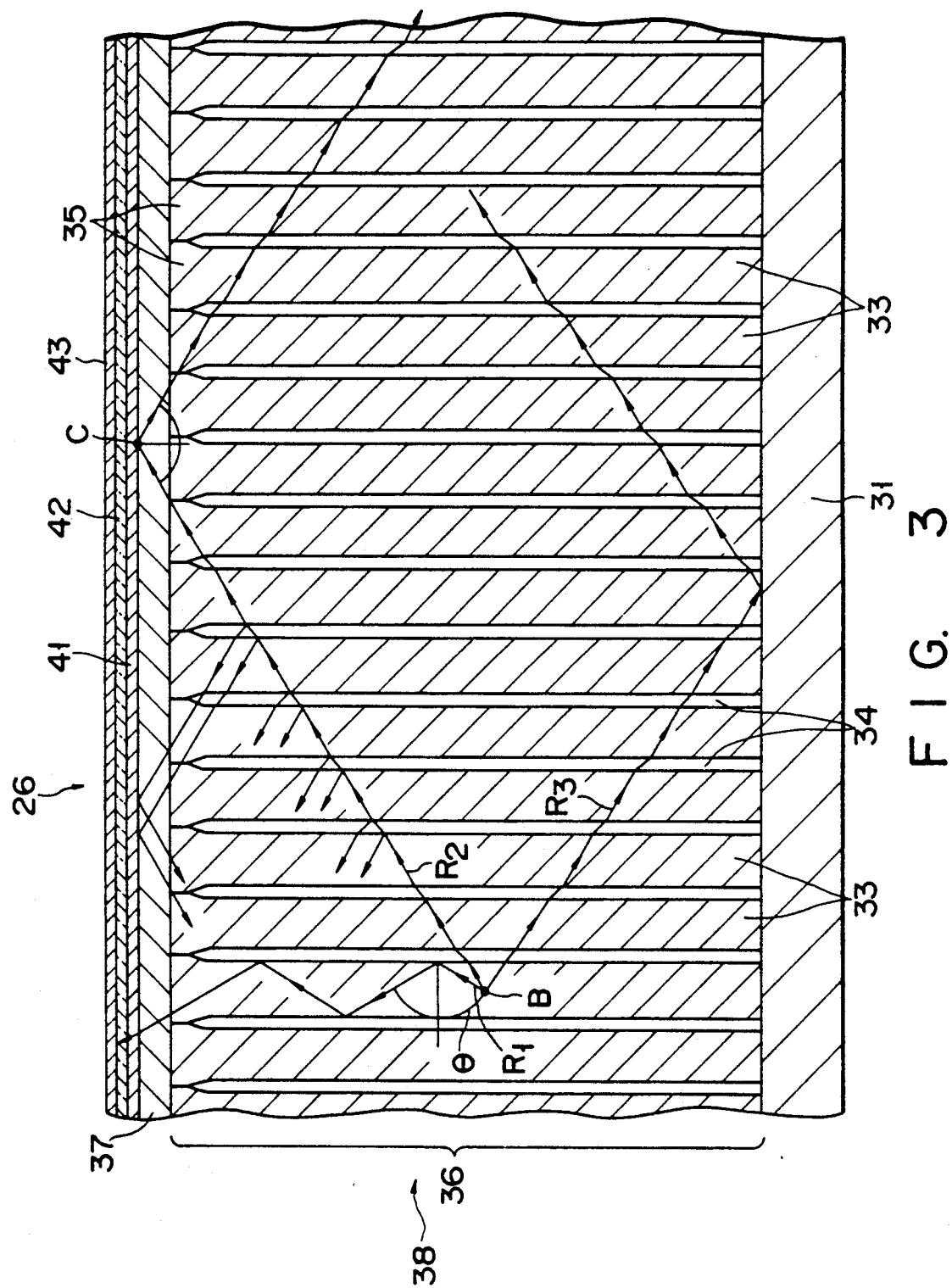
FIG. 3 is an enlarged sectional view of an input screen of an X-ray image intensifier according to a second embodiment of the present invention.

FIG. 3 shows an input screen of an X-ray image intensifier according to a second embodiment of the present invention. In the second embodiment, the structure of the input screen is the same as that of the input screen in the first embodiment, except that the light-absorbing layer 32 is omitted. Therefore, the same reference numerals in FIG. 3 denote the same parts as in the first embodiment, and a detailed description thereof will be omitted.

Similar to the first embodiment, in the second embodiment, of the rays which are emitted in various directions from a point B in one of columnar crystals 33 of a phosphor layer 38, a ray R1, which is incident on the interface between the columnar crystal and a gap 34 at an angle $\theta$ larger than a critical angle $\theta c$, propagates in the crystal while being totally reflected by the interface a plurality of times and reaches to a photoemissive layer 34 passing through a low-refractive-index layer 41 and a conductive film 42.

Of the rays which are incident on the interface at an angle $\theta$ smaller than the critical angle $\theta c$, a ray R2 propagating toward the photoemissive layer 43 successively diffuses into the adjacent columnar crystals 33, and is incident onto a point C on the interface between the phosphor layer 38 and the low-refractive-index layer 41 at an angle $\theta$. All the rays R2 which are incident on the interface between the columnar crystal 33 and the gap 34 at the angle $\theta < \theta c$ are totally reflected at the point C and hence are not incident on the photoemissive layer 43. The reflected rays R2 successively diffuse into the adjacent columnar crystals 33 and are incident on the upper surface of the substrate 31 at the angle $\alpha$, where they are subjected to regular reflection.

Subsequently, while repeating total reflection at the low-refractive-index layer 41 and regular reflection at the upper surface of the substrate 31, the rays R2 are gradually attenuated due to the light absorbing effect of the phosphor layer 38 and disappear.

A ray R3 emitted from the emission point B and diffused toward the substrate 31 repeats regular reflection at the substrate 31 and total reflection at the low-refractive-index layer 41 a plurality of times, and is finally attenuated and nullified in the phosphor layer 38.

As described above, even in the second embodiment without a light-absorbing layer, the rate, at which fluorescence components, represented by the rays R2 and R3 causing degradation in the resolution characteristics of the input screen 26, are incident on the photoelectric surface 43, can be greatly decreased. Therefore, as indicated by a curve B in FIG. 4, the MTF characteristics of the input screen according to the second embodiment are greatly improved as compared with the MTF characteristics of the conventional input screen. As a result, referring to FIG. 5, the MTF characteristics of the X-ray image intensifier according to the second embodiment are greatly improved as compared with the conventional X-ray image intensifier having the phosphor layer whose thickness is the same as that of the phosphor layer in the second embodiment. Note that even when the thickness of the phosphor layer 38 was set to be 600 μm which was about 1.5 times that of the conventional phosphor layer, in order to improve the absorption efficiency of X-rays, the MTF characteristics of the input screen underwent no degradation.

In the first and second embodiments, the continuity and the denseness of the phosphor layer 38 are improved, and the upper surface of the phosphor layer 38 formed of the columnar crystals 33 is flattened. Although an improvement in continuity and denseness of the upper surface of the phosphor layer 38 is useful to improve the sensitivity of the photoemissive layer 43, it is not an essential condition for an improvement in the MTF characteristics of the input screen 26, which is an object of the present invention. Only the flatness of the upper surface of the phosphor layer 38 is an essential condition.

A method of flattening the upper surface of the first phosphor layer 36 formed of a number of columnar crystals 33 is not limited to the tumbling method, but the following methods can be used: a method of urging a woven or nonwoven fabric against the upper surface of the first phosphor layer 36 and sliding it thereon; a method of urging a rotating member such as a roller against the upper surface of the first phosphor layer 36; and various mechanical methods such as a shot blasting at low pressures, a press using a mold, and a grinding with a mechanical blade. Other methods may be used as well: dissolving of only the upper surface of the first phosphor layer 36 by using a liquid capable of dissolving a phosphor; sputtering the upper surface by ion beams or a plasma; surface fusing by laser beams or electron beams; and hot-press using a mold.

In the first and second embodiments, on the flattened upper surface of the first phosphor layer 36, the second phosphor layer 37 formed of the same phosphor as the first layer 36 is deposited at a high vacuum. However, the second phosphor layer 37 may be formed of another phosphor material such as a CsI phosphor containing no Na. Further, the second phosphor layer 37 may be replaced by a layer formed of a material other than a phosphor material, having a refractive index near the refractive index (1.84) of the CsI phosphor, e.g., NaI, LiI, MgO, ThO$_2$, SiO, Al$_2$O$_3$, or CsBr.

If the upper surface of the first phosphor layer 36 is sufficiently flattened to form substantially mirror surface, the second phosphor layer 37 may be omitted.

Figure 6:
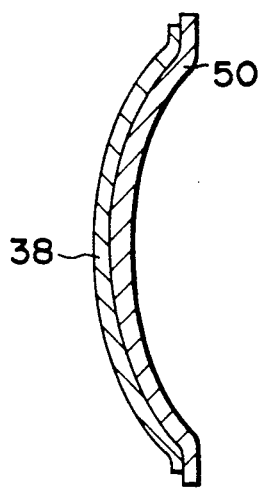
Figure 7:
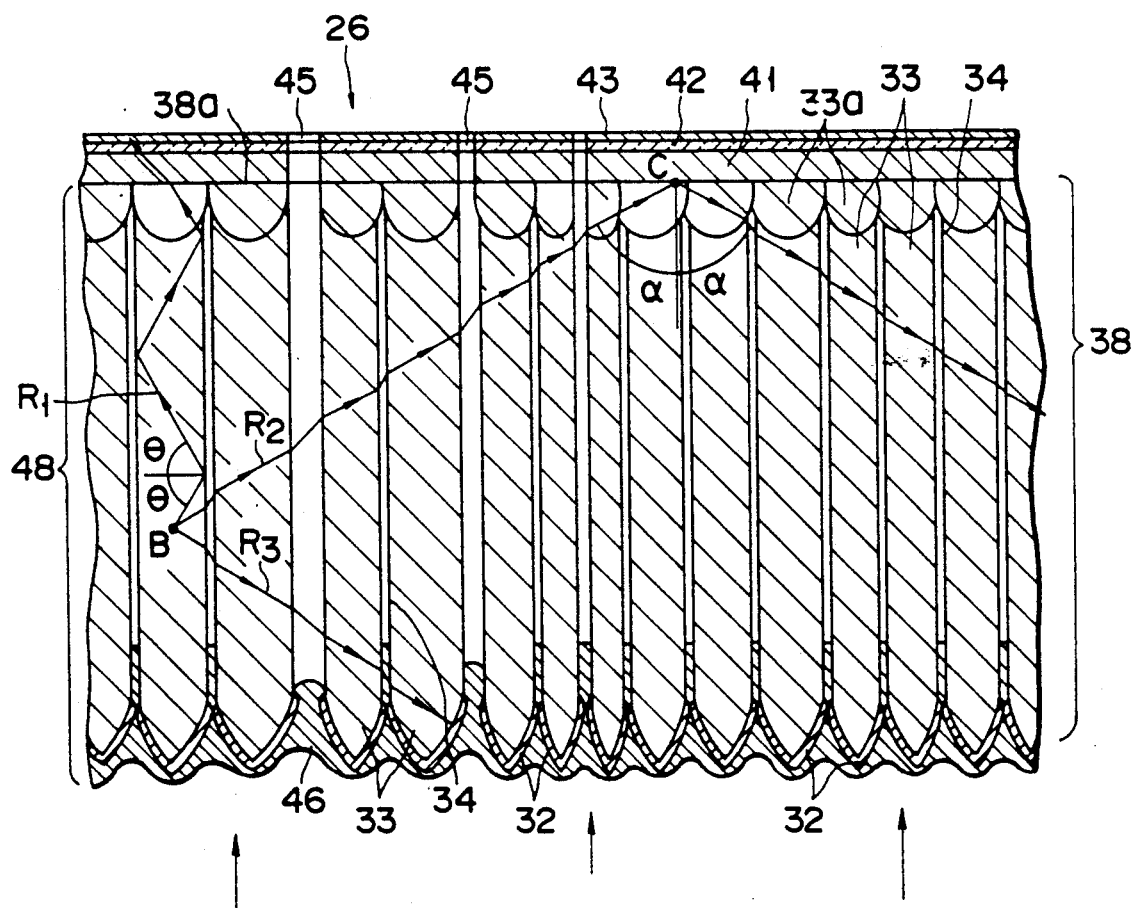
Figure 8:
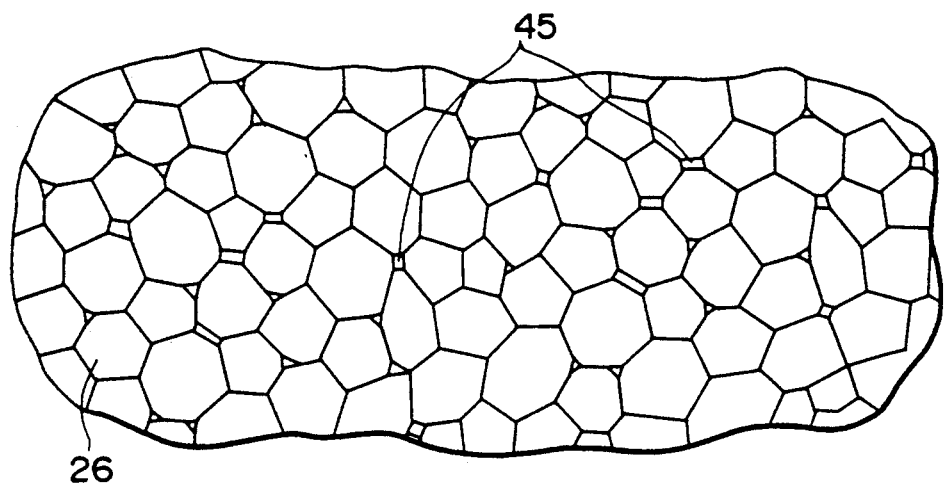

FIGS. 6 to 8 show a third embodiment of the present invention.

The third embodiment differs from the first embodiment in part of the structure of the input screen and the method of manufacturing the input screen.

The structure of the input screen will be described together with the method of manufacturing the same.

As shown in FIG. 6, a stainless steel mold 50 is prepared. The mold 50 is formed in a predetermined spherical shape which is matched with the shape of an input screen 26 of an X-ray image intensifier and has a mirror-polished convex surface.

The mold 50 is placed in a vacuum deporation system (not shown) in order to deposit a CsI/Na phosphor on the convex surface of the mold 50. With this process, a large number of CsI/Na phosphor crystal particles 33a are deposited on the convex surface, as shown in FIG. 7. Then, a CsI/Na phosphor is deposited on these crystal particles 33a, and columnar crystals 33 are grown on the crystal particles with projection portions of the crystal particles being used as seeds. As a result, a phosphor layer 38 formed of a large number of columnar crystals 33 and having a thickness of about 40 μm is formed. Note that the phosphor layer 38 is designed such that the columnar crystals 33 are optically isolated from one another through gaps 34.

A light-absorbing layer 32 made of carbon and an SiO$_2$ coat 46 are sequentially formed on the phosphor layer 38 by an RF sputtering method.

Subsequently, the mold 50 and a stacked layer 48 constituted by the phosphor layer 38 and the like formed on the mold 50 are heated, so that the stacked layer 48 is separated from the mold 50 due to the difference in thermal expansion coefficient between the mold and the phosphor layer. In this case, since the strength of the phosphor layer 38 is reinforced by the coat 46, destruction of the phosphor layer upon separation can be prevented.

Note that the surface of the phosphor layer 38 which is separated from the mold 50, i.e., a separated surface 38a is formed into a concave mirror surface in accordance with the mirror-polished convex surface of the mold 50.

A low-refractive-index layer 41 made of, e.g., SiO$_2$ is formed on the separated surface 38a of the phosphor layer 38 so as to have a thickness of about 2 μm. Thereafter, a transparent conductive film 42 and a photoemissive layer 43 formed of, e.g, K$_2$CsSb are sequentially formed on the low-refractive-index layer 41.

As shown in FIGS. 7 and 8, a plurality of pinholes 45 are formed in the upper surface of the input screen 26 manufactured in the manner described above, because of the gaps 34 between the large number of columnar crystals 33 constituting the phosphor layer 38.

The operation of the input screen 26 having the above-described arrangement will be described.

Assume, as shown in FIG. 7, that an X-ray image is radiated from the coat 46 side onto the input screen 26 and absorbed by the phosphor layer 38, and fluorescence is emitted from a point B in one of the columnar crystals 33 of the phosphor layer 38. Of the rays which are emitted from the point B in various directions, a ray R1, which is incident on the interface between the co-lumnar crystal 33 and a corresponding gap 34 at an angle $\theta$ larger than the critical angle $\theta c$, propagates in the crystal while being totally reflected by the interface a plurality of times and reaches to the photoemissive layer 43 through the low-refractive-index layer 41 and the conductive layer 42.

Of the rays which are incident on the interface at an angle $\theta$ smaller than the critical angle $\theta c$, a ray R2 propagating toward the photoemissive layer 43 successively diffuses into the adjacent columnar crystals 33 and is incident at an angle $\alpha$ on a point C on the interface between the phosphor layer 38 and the low-refractive-index layer 41, which point is located far away from the emission point B in the lateral direction of the phosphor layer 38.

In this case, since the upper surface of the phosphor layer 38 is substantially mirror-polished, if the relative refractive index Nr of the low-refractive-index layer 41 with respect to the phosphor satisfies equation (a), all the rays R2, which are incident on the interface between the columnar crystal 33 and the gap 34 at the angle $\theta < \theta c$, are totally reflected at the point C and hence are not incident on the photoemissive layer 43. Each ray R2 totally reflected at the point C successively diffuses into the adjacent columnar crystals 33 and is incident on the coat 46 at the angle $\alpha$. However, since the light-absorbing film 32 having a high absorptance of 90 to 95% for fluorescence is formed between the coat 46 and the phosphor layer 38, the ray R2 is effectively absorbed by the film 32 and disappears.

Note that the refractive index N of SiO$_2$ constituting the low-refractive-index layer 41 is about 1.49 and satisfies inequality (b). Therefore, the ray R2 is eliminated without being incident on the photoemissive layer 43.

In contrast to this, a ray R3 emitted from the emission point B and diffusing toward the coat 46 is absorbed by the light-absorbing layer and disappears.

Even in the third embodiment having the above-described arrangement, the rate, at which fluorescent components represented by the rays R2 and R3 and causing degradation in the resolution characteristics of the input screen 26 are incident on the photoemissive layer 43, can be greatly decreased. For this reason, the MTF characteristics of the input screen 26 are greatly improved as compared with the MTF characteristics of the conventional input screen. Therefore, the MTF characteristics of the X-ray image intensifier having the input screen 26 are greatly improved as compared with the X-ray image intensifier having the phosphor layer whose thickness is the same as that of the phosphor layer of the input screen 26. In addition, according to the third embodiment, since the phosphor layer 38 is formed by depositing a phosphor on a mirror-polished surface of a mold, the separated surface of the phosphor layer, i.e., the upper surface can be formed into a better mirror surface than those in the first and second embodiments. Therefore, fluorescent components causing degradation in the resolution characteristics can be more reliably reflected and eliminated.

Figure 9:
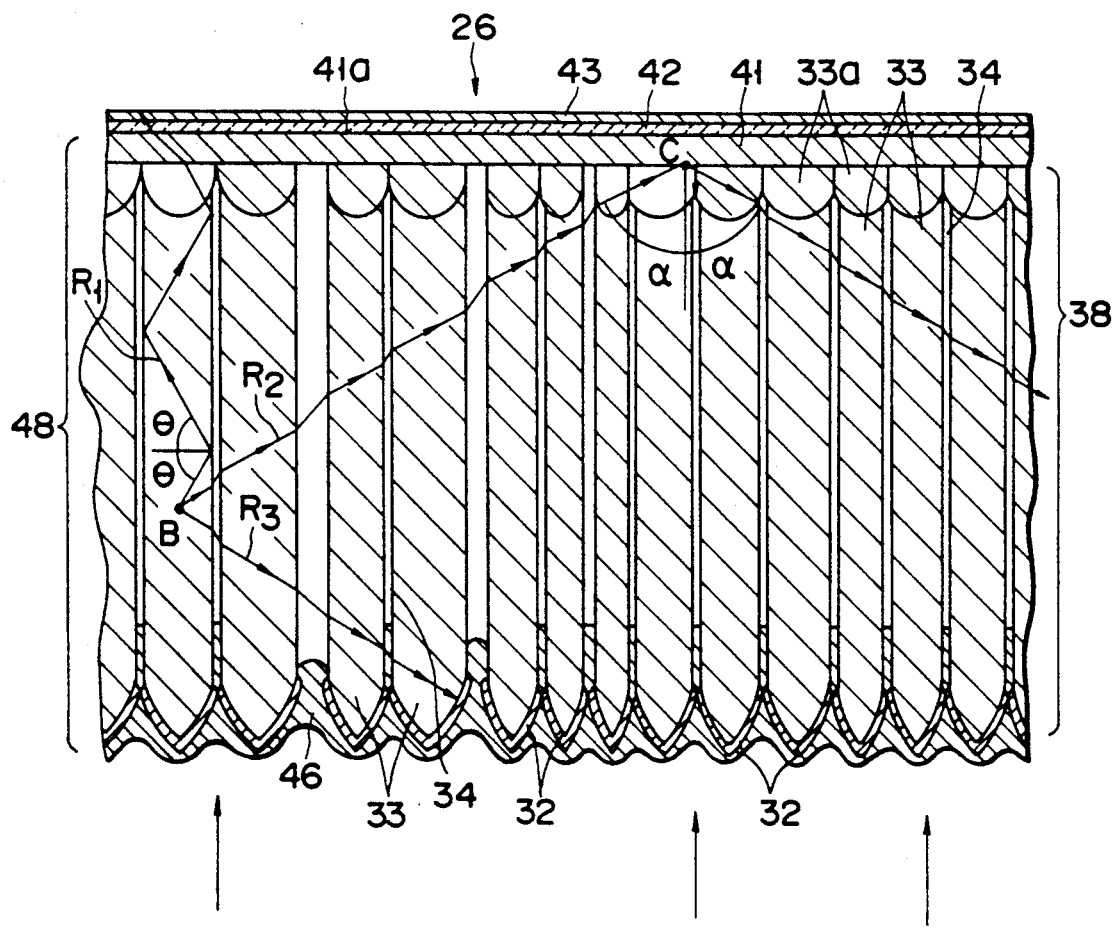
FIG. 9 is an enlarged sectional view of an input screen of an X-ray image intensifier according to a fourth embodiment of the present invention.

FIG. 9 shows an input screen of an X-ray image intensifier according to a fourth embodiment of the present invention.

In the fourth embodiment, an input screen has the same structure as that of the input screen in the third embodiment, and only a method of manufacturing the input screen is different from that of the third embodiment.

According to the fourth embodiment, a mold identical to the mold 50 in the third embodiment is used. A low-refractive-index layer 41 made of NaF is deposited on the mirror-polished convex surface of the mold to a thickness of about 2 μm under a high vacuum of $1 \times 10^{-5}$ Torr or less.

On the upper surface of the layer 41, a phosphor layer 38 formed of a large number of CsI/Na phosphor columnar crystals 33, a light-absorbing layer 32 made of carbon, and an $SiO_2$ coat 46 are sequentially formed by the same method as in the third embodiment.

Then, the mold 50 and a multilayer film 48 constituted by the low-refractive-index layer 41, the phosphor layer 38, and the like which are formed on the mold 50 are heated. As a result, the multilayer film 48 is separated from the mold 50 due to the difference in thermal expansion coefficient between the mold and the low-refractive-index layer. A transparent conductive film 42 and a photoelectric layer 43 formed of, e.g., $K_2CsSb$ are sequentially formed on a separated surface 41a of the layer 41.

According to the input screen 26 manufactured in this manner described above, the refractive index N of NaF constituting the low-refractive-index layer 41 is about 1.32 and hence satisfies inequality (b). Similar to the third embodiment, therefore, fluorescent components as factors causing degradation in the resolution characteristics of the input screen 26 are totally reflected by the interface between the phosphor layer 38 and the low-refractive-index layer 41 and subsequently disappear. Hence, the MTF characteristics of the input screen and of the X-ray image intensifier can be improved as compared with the conventional X-ray image intensifier.

In addition to the advantages obtained in the third embodiment, the input screen of the fourth embodiment has the following advantage.

In the input screen of the third embodiment, as shown in FIGS. 7 and 8, a large number of pinholes 45 are formed in the low-refractive-index layer 41 and the conductive layer 42, because of the gaps 34 between the columnar crystals 33. These pinholes 45 adversely affect the sensitivity of the photoemissive layer 43. More particularly, the photoemissive layer 43 is formed at a high temperature of 100° C. or more. For this reason, the substance which constitutes the photoemissive layer gradually diffuses into the phosphor layer 38 through the pinholes 45 during formation of the photoemissive layer 43. As a result, the sensitivity of the photoemissive layer 43 is degraded at the end of the formation thereof.

In contrast to this, according to the input screen of the fourth embodiment, since the low-refractive-index layer 41 is deposited on the mirror-polished surface of the mold 50, a high degree of continuity and denseness of the layer 41 can be ensured, and no pinholes are formed. Therefore, no pinholes are formed in the transparent conductive film 42 formed on the layer 41. This prevents degradation in sensitivity of the photoemissive layer 43 at the time of the formation thereof.

In an input screen having the same arrangement as that described in the third and fourth embodiments, the thickness of the phosphor layer 38 was set to be 1,000 μm which is about 2.6 times that of the phosphor layer in the embodiments. In an X-ray image intensifier using this input screen, the same MTF characteristics as those of the conventional input screen were obtained. In addition, the X-ray absorptance was increased, and a better image having less X-ray quantum noise was obtained as compared with the conventional input screen. Hence, it was confirmed that the input screen was effective for X-ray diagnosis.

In the third and fourth embodiments, the surface of the phosphor layer 38, on which X-rays are incident, is not flattened. Therefore, the fluorescent components causing degradation in the MTF characteristics can be effectively caused to evade the input screen without being reflected by the incident surface of the phosphor layer 38. Thus, the MTF characteristics of the input screen can be improved without the light-absorbing layer 32 as compared with the conventional input screen.

In the third and fourth embodiments, $SiO_2$ is used as a material for the coat 46 for reinforcing the phosphor layer. However, other materials can be arbitrarily selected for the coat 46. For example, if CdS or the like is used, a coat also having the function of the light-absorbing layer 32 can be obtained.

By properly selecting the deposition conditions of the CsI/Na phosphor of the phosphor layer 38, the mechanical binding force between the columnar crystals 33 can be increased within the range in which the light guide effect of the columnar crystals 33 is not substantially reduced, thereby omitting the reinforcement by means of the coat 46.

In the first to fourth embodiments, $SiO_2$ and NaF are selected as materials for the low-refractive-index layer 41. However, LiF, CsF, $CaF_2$, $BaF_2$, $MgF_2$, $Na_3$, $AlF_6$, or the like may be selected as a material satisfying inequality (b), or a multilayer structure formed by laminating some of these materials may be used.

The refractive index N of the low-refractive-index layer 41 which satisfies inequality (b) is considered as an optimal value in terms of an improvement in the resolution characteristics of an input screen. However, even if the refractive index N does not satisfy inequality (b), the resolution of the input screen can be improved as compared with the conventional input screen as long as N is smaller than the refractive index (about 1.84) of CsI constituting the phosphor layer. KI, KBr, $LaF_3$, $NdF_3$, $CeF_3$, or the like can be selected as such a material for the low-refractive-index layer 41.

In the above-described embodiments, carbon or Ni-Cr alloy is used for the light-absorbing layer 32. However, other materials having high absorptances in the fluorescent light range can be arbitrarily selected as materials for light-absorbing layers.

What is claimed is:

1. An X-ray image intensifier comprising:
   an input screen for converting incident X-rays into photoelectrons; and
   an output screen, arranged to oppose said input screen, for converting the photoelectrons into visible light;
   said input screen including:
   a substrate,
   a phosphor layer formed on said substrate and having a large number of columnar crystals of a phosphor which extend from said substrate toward said output screen, said columnar crystals having end faces constituting a smooth surface facing said output surface,
   a low-refractive-index layer formed on said phosphor layer and made of a material having a refractive index smaller than a refractive index of said phosphor, with respect to the light having a specified wavelength, at which the fluorescence of the phosphor is the most intensive, and a photoemissive layer formed directly or indirectly on said low-refractive-index layer.

2. An X-ray image intensifier according to claim 1, wherein said input screen comprises a light-absorbing layer, formed between said substrate and said phosphor layer, for absorbing at least part of fluorescence emitted by said phosphor.

3. An X-ray image intensifier according to claim 2, wherein said light-absorbing layer is formed of a material selected from the group consisting of an Ni-Cr alloy and carbon.

4. An X-ray image intensifier according to claim 1, wherein said low-refractive-index layer is formed of at least one of materials selected from the group consisting of $SiO_2$, NaF, LiF, CsF, $CaF_2$, $BaF_2$, $MgF_2$, $Na_3AlF_6$, KI, KBr, $LaF_3$, $NdF_3$, and $CeF_3$.

5. An X-ray image intensifier according to claim 1, wherein said phosphor essentially consists of CsI: Na.

6. An X-ray image intensifier according to claim 1, wherein said low-refractive-index layer has a refractive index of not more than 1.54.

7. An X-ray image intensifier according to claim 1, wherein said input screen comprises a second phosphor layer formed of a phosphor having substantially the same refractive index as that of said phosphor and formed between said phosphor layer and said low-refractive-index layer.

8. An X-ray image intensifier according to claim 1, wherein said columnar crystals are arranged with gaps therebetween for optically isolating said crystals from one another, each of said columnar crystals having a distal end portion kept apart from said substrate, and the distal end portion having a larger cross section than that of other portion of the crystal.

9. An X-ray image intensifier comprising:
an input screen for converting incident X-rays into photoelectrons; and
an output screen, arranged to oppose said input screen, for converting the photoelectrons into visible light;
said input screen including:
a phosphor layer having a smooth emergence surface facing said output screen, an incidence surface opposite said emergence surface, on which X-rays are incident, and a large number of columnar crystals of a phosphor which extend between said incidence and emergence surfaces,
a low-refractive-index layer formed on said emergence surface of said phosphor layer and having a refractive index smaller than that of said phosphor, with respect to the light having a specified wavelength, at which the fluorescence of the phosphor is the most intensive, and
a photoemissive layer formed directly or indirectly on said low-refractive-index layer.

10. An X-ray image intensifier according to claim 9, wherein said phosphor layer is formed by growing said large number of columnar crystals on a smooth surface of a mold which has a predetermined shape, and separating said grown columnar crystals from the mold, a separated surface of said phosphor layer, which is separated from the mold, constituting said emergence surface.

11. An X-ray image intensifier according to claim 9, wherein said phosphor layer is formed by forming said low-refractive-index layer on a smooth surface of a mold which has a predetermined shape, and growing said large number of columnar crystals on said formed low-refractive-index layer, said emergence surface of said phosphor layer being constituted by a contact surface between said columnar crystals and said low-refractive-index layer, and said photoemissive layer being formed directly or indirectly on a separated surface of said low-refractive-index layer, which is separated from the mold.

12. An X-ray image intensifier according to claim 9, wherein said input screen comprises a light-absorbing layer, formed on said incidence surface of said phosphor layer, for absorbing part of fluorescence emitted by said phosphor.

13. An X-ray image intensifier according to claim 12, wherein said input screen comprises a protective film, formed on said light-absorbing layer, for reinforcing said phosphor layer.

14. A method of manufacturing an input screen, for converting incident X-rays into photoelectrons, comprising the steps of:
preparing a mold having a smooth surface with a predetermined shape;
forming a phosphor layer, having a large number of columnar crystals of a phosphor, on said surface of the mold;
separating said formed phosphor layer from the mold;
forming a low-refractive-index layer, having a refractive index smaller than that of said phosphor, on a separated surface of said phosphor layer, which is separated from said mold; and
forming a photoemissive layer directly or indirectly on said low-refractive-index layer.

15. A method according to claim 14, wherein said step of forming phosphor layer includes forming crystal particles of said phosphor on the surface of the mold, and growing columnar crystals of said phosphor on said crystal particles.

16. A method according to claim 14, wherein said separating step includes heating said mold and said phosphor layer, and separating said phosphor layer from the mold due to a difference in thermal expansion coefficient therebetween.

17. A method according to claim 14, which further comprises the step of forming a protective film for reinforcing said phosphor layer on said phosphor layer before said separating step.

18. A method according to claim 14, which further comprises the steps of forming a light-absorbing film for absorbing part of fluorescence emitted by said phosphor on said phosphor layer before said separating step, and forming a protective film for reinforcing said phosphor layer on said light-absorbing film.

19. A method of manufacturing an input screen for converting incident X-rays into photoelectrons, comprising the steps of:
preparing a mold having a smooth surface with a predetermined shape;
forming a low-refractive-index layer on the surface of the mold;
forming, on said low-refractive-index layer, a phosphor layer having a large number of columnar crystals of a phosphor having higher refractive index than that of said low-refractive-index layer;
separating said low-refractive-index layer, on which said phosphor layer is formed, from the mold; and forming a photoemissive layer directly or indirectly on a separated surface of said low-refractive-index layer, which is separated from the mold.

20. A method according to claim 19, wherein said step of forming phosphor layer includes forming crystal particles of said phosphor on said low-refractive-index layer, and growing columnar crystals of said phosphor on said crystal particles.

21. A method according to claim 19, wherein said separating step includes heating said mold and said low-refractive-index layer on which said phosphor layer is formed, and separating said low-refractive-index layer from the mold due to a difference in thermal expansion coefficient therebetween.

* * * * *